United States Patent [19]

Hsu

[11] Patent Number: 5,551,328
[45] Date of Patent: Sep. 3, 1996

[54] CUTTING APPARATUS

[76] Inventor: Yuan-Chang Hsu, 4F, No. 13, Lane 277, Chung Shan Rd., San Hsia Chen, Taipei Hsien, Taiwan

[21] Appl. No.: 374,176
[22] Filed: Jan. 18, 1995
[51] Int. Cl.$^6$ ............................................. B26D 1/00
[52] U.S. Cl. ................................. 83/508.3; 83/425.4
[58] Field of Search ............................ 83/425.4, 487, 83/503, 508.3; 144/2 R

[56] References Cited

U.S. PATENT DOCUMENTS 4,077,291  3/1978  Obenshain ........................... 83/508.3
5,090,281  2/1992  Paulson et al. ...................... 83/508.3

Primary Examiner—W. Donald Bray
Attorney, Agent, or Firm—Browdy and Neimark

[57] ABSTRACT

A cutting tool including a dovetailed tool rest, which has a dovetail platform, a rack longitudinally adjustably mounted on the dovetail platform platform, and two scales longitudinally bilaterally disposed on the dovetail platform along the rack, and a plurality of cutting tools equidistantly mounted on the dovetailed tool rest and bridged over the rack, each cutting tool having a casing mounted on the dovetail platform by a dovetail joint and fixed in position by a tightening up screw, a cutter blade extended out of the casing, and a coupling block fixedly fastened to the casing to hold a high-pressure air tube.

4 Claims, 3 Drawing Sheets

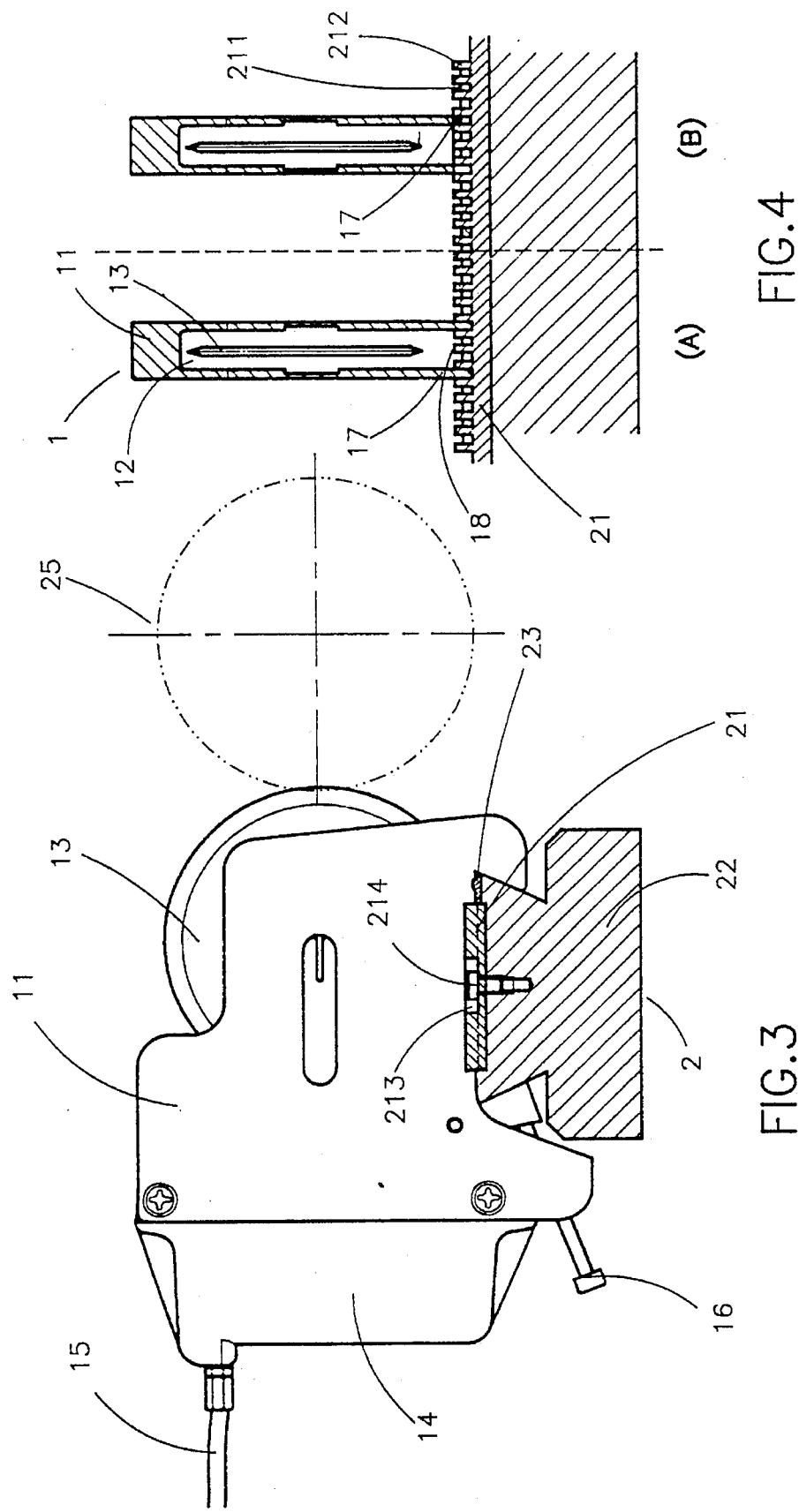

CUTTING APPARATUS

BACKGROUND OF THE INVENTION

The present invention relates to a cutting apparatus having a row of cutting tools mounted on a dovetail tool rest above a rack for cutting plastic sheets and films, paper, etc.

FIG. 1 shows a cutting apparatus for cutting plastic sheets and films, paper, etc., according to the prior art. The cutting apparatus comprises a tool rest 2a having a dovetail platform, and a row of cutting tools 1a mounted on the dovetail platform 2a. Each cutting tool 1a comprises a casing formed of two parallel frames 11a and 12a bridged over the dovetail platform to hold a cutter blade 13a, a tightening screw 16a mounted on the casing and turned to fix the casing to the dovetail platform 2a, and a coupling block 14a which serves also as an air pressure chamber fixedly fastened to the casing to hold a high-pressure air tube 15a. High pressure air from air tube 15a drives cutter blade 13 to cut material on the circumference of the work piece 1 not shown in FIG. 1. This structure of cutting apparatus has drawbacks. One drawback of this structure of cutting apparatus is its complicated procedure of precisely adjusting the pitch between each two adjacent cutting tools. Another drawback of this structure of cutting apparatus is that the cutting tools tend to be tilted when they are adjusted. Another drawback of this structure of cutting apparatus is that the cutting tools tend to displace when they are operated to cut hard objects. Furthermore, because the casing of each cutting tool is comprised of two parallel frames fastened together by fastening elements to hold a respective cutter blade, the assembly process of an individual cutting tool is complicated.

SUMMARY OF THE INVENTION

The present invention has been accomplished under the circumstances in view. It is one object of the present invention to provide a cutting apparatus which eliminates the aforesaid drawbacks. It is another object of the present invention to provide a cutting apparatus for cutting plastic sheets and films, paper, etc., which is simple in structure and inexpensive to manufacture.

According to one aspect of the present invention, the cutting tool comprises a dovetailed tool rest having a dovetail platform, a row of cutting tools having a respective dovetail groove engaged with the dovetail platform, and a rack mounted on the dovetail platform and engaged with the dovetail groove of each cutting tool. The rack has two oblong mounting holes longitudinally disposed near two opposite ends thereof and respectively fixed to the dovetail platform by a respective screw bolt. By loosening the screw bolts from the oblong mounting holes, the position of the rack on the dovetail platform can be adjusted longitudinally.

According to another aspect of the present invention, two scales are made on the dovetail platform at two opposite sides by the rack for calibration.

According to still another aspect of the present invention, the casing of each cutting tool is made in integrity, and therefore the assembly process of each individual cutting tool is simple.

BRIEF DESCRIPTION OF THE DRAWINGS

FIG. 3 is a side view in section of the cutting apparatus of the present invention; and FIG. 4 is a front view in section of the cutting apparatus of the present invention.

DETAILED DESCRIPTION OF THE PREFERRED EMBODIMENT

Figure 1:
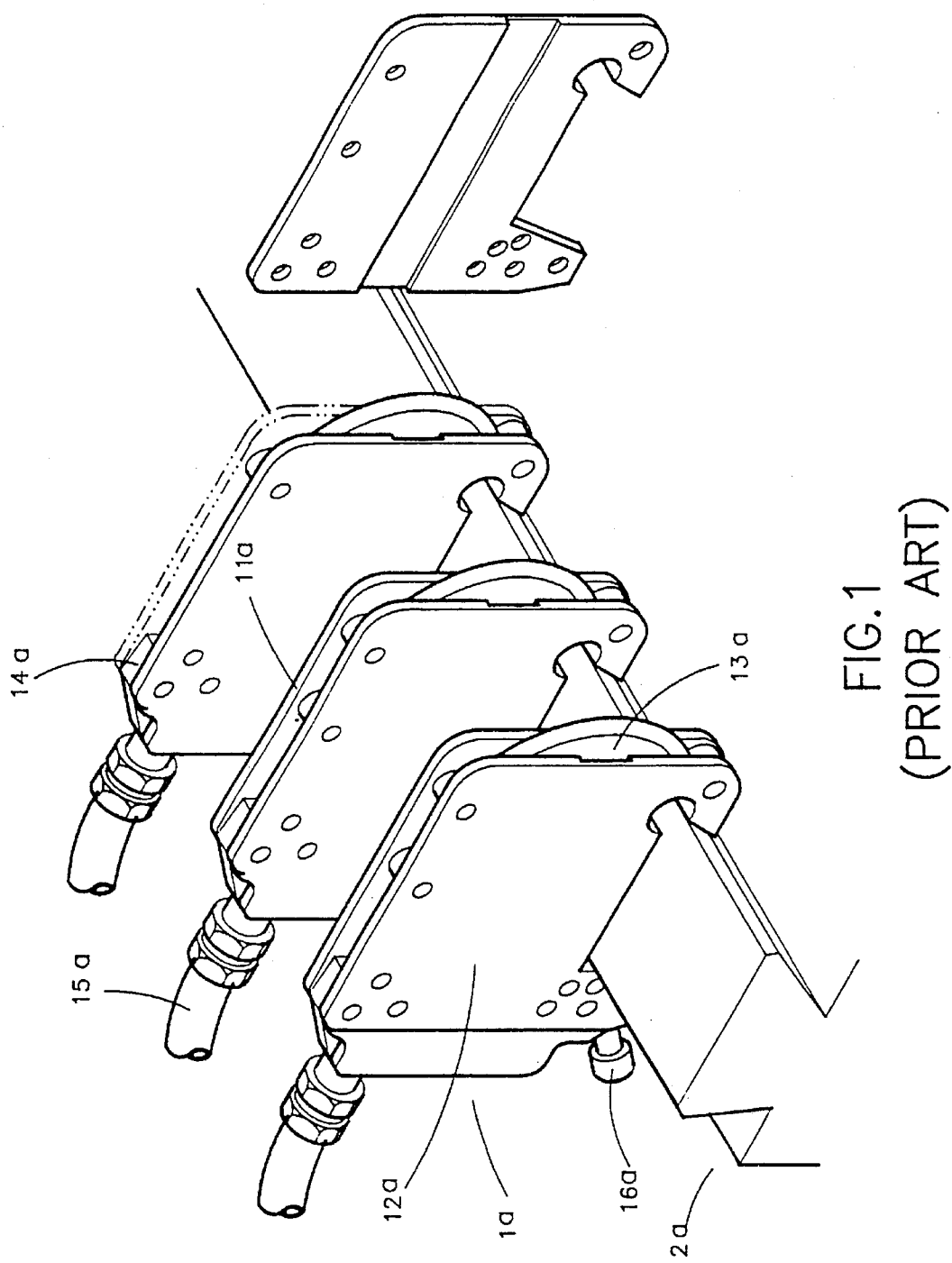
FIG. 1 shows a cutting apparatus according to the prior art.
Figures 2, 2A:
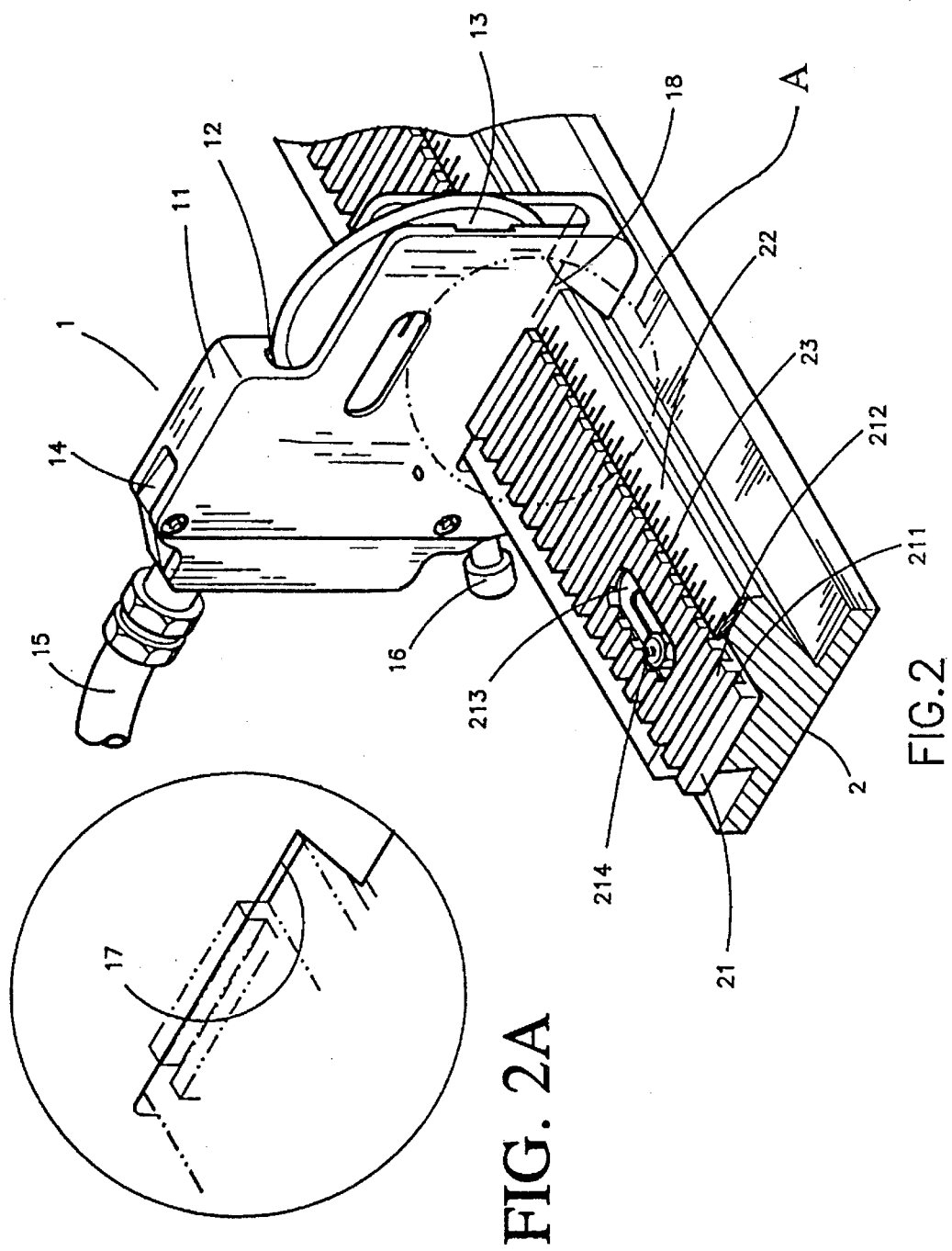
FIG. 2 is a cutaway of a cutting apparatus according to the present invention.
FIG. 2A is an elnarged view of circled area A in FIG. 2.

Referring to FIG. 2, a cutting apparatus in accordance with the present invention is generally comprised of a row of cutting tools 1, and a dovetailed tool rest 2.

Referring to FIGS. 2 and 2A, the cutting tool 1 comprises a casing 11 having a front open end 18 and defining a receiving chamber 12, a cutter blade 13 disposed in the receiving chamber 12 and extended out of the front open end 18 of the casing 11, a dovetail groove 17 engaged with the dovetailed tool rest 2, a tightening up screw 16 mounted on the casing 11 and turned to fix the casing 11 to the dovetailed tool rest 2, a coupling block or air pressure chamber 14 fixedly fastened to the casing 11 to hold a high-pressure air tube 15. The casing 11 is made in integrity, and therefore the cutting tool 1 can be conveniently assembled. High pressure air from air tube 15 drives cutter blade 13 to cut the workpiece or material on the circumference of a rotary pivot 25 shown in dashed lines in FIG. 3. The workpiece is disposed on the rotary pivot 25 near the cutter blades 13 and will be in contact with the cutter blades when pushed forward by the air pressure. The manner that cutter blades 13 are driven by high pressure air against the rotary pivot is conventional and not part of the claimed invention.

Referring to FIG. 3, the dovetailed tool rest 2 comprises a dovetail platform 22, a rack 21 mounted on the dovetail platform 22 and formed of transverse grooves 211 and transverse teeth 212 alternatively arranged together, and two scales 23 integrally made on the dovetail platform 22 at two opposite sides by the rack 21. The rack 21 has two oblong mounting holes 213 near two opposite ends thereof adjustably fastened to the dovetail platform 22 of the dovetailed tool rack 2 by screw bolts 214.

Referring to FIG. 4, when the dovetail groove 17 of one cutting tool 1 is engaged with the dovetailed tool rest 2, one transverse tooth 212 of the tool rest 2 is fitted into the dovetail groove 17 to stop the casing 11 of the cutting tool 1 from being moved in the longitudinal direction relative to the rack 21. When the tightening up screw 16 is tightened up, the cutting tool 1 is fixed to the dovetailed tool rest 2.

The row of cutting tools 1 are equidistantly arranged on the dovetailed tool rest 2. The transverse grooves 211 and teeth 212 are processed by a precision machine. By means of the screw bolts 214 and the oblong slots 213, the position of the rack 21 on the dovetail platform 22 (namely, the positions of the cutting tools 1 on the dovetail tool rest 2) can be adjusted in the longitudinal direction precisely. The position adjustment of the rack 21 can be calibrated through the scales 23.

Referring to FIG. 4 again, the dovetail groove of the casing may be made in either of two alternate forms, namely, the form A and the form B. According to the form A, the two opposite lateral sides of the dovetail groove are of equal length respectively matched with the two opposite lateral sides of the dovetail platform. According to the form B, the two opposite lateral sides of the dovetail groove are of different lengths. The longer side is attached to the dovetailed tool rest and the shorter side is stopped above the dovetailed tool rest.

While only one embodiment of the present invention has been shown and described, it will be understood that various modifications and changes could be made without departing from the spirit and scope of the invention.

What is claimed is:

1. A cutting tool comprising a dovetailed tool rest having a dovetail platform, and a row of cutting tools having a respective dovetail groove engaged with said dovetail platform, wherein a rack is mounted on said dovetail platform and engaged with the dovetail groove of each cutting tool, said rack having two oblong mounting holes longitudinally disposed near two opposite ends thereof and respectively fixed to said dovetail platform by a respective screw bolt; two scales are made on said dovetail platform at two opposite sides by said rack; the position of said rack on said dovetail platform can be adjusted longitudinally by means of loosing the screw bolts from said oblong mounting holes.

2. The cutting tool of claim 1 wherein said scales are integrally marked on said dovetail platform of said dovetailed tool rest.

3. The cutting tool of claim 1 wherein said scales are separately fastened tO said dovetail platform of said dovetailed tool rest.

4. The cutting tool of claim 1 wherein each cutting tool comprises a casing made in integrity, said casing having a front opening end and defining a receiving chamber, a cutter blade disposed in said receiving chamber and extended out of said front open end, and a dovetail groove engaged with said dovetailed tool rest.

* * * * *